(12) United States Patent  (10) Patent No.: US 7,762,155 B2
Vranish  (45) Date of Patent: Jul. 27, 2010

(54) PARTIAL TOOTH GEAR BEARINGS

(75) Inventor: John M. Vranish, Crofton, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 26 days.

(21) Appl. No.: 11/444,808

(22) Filed: May 25, 2006

(65) Prior Publication Data

US 2006/0219039 A1    Oct. 5, 2006

Related U.S. Application Data

(63) Continuation of application No. 10/789,031, filed on Feb. 26, 2004, now abandoned.

(60) Provisional application No. 60/453,338, filed on Feb. 27, 2003.

(51) Int. Cl.
F16H 55/00    (2006.01)
(52) U.S. Cl. .............. 74/414; 74/409; 74/462; 475/344
(58) Field of Classification Search ............. 74/409, 74/411, 440, 460, 461, 414; 475/338, 339, 475/340, 342, 344
See application file for complete search history.

(56) References Cited

U.S. PATENT DOCUMENTS

| 1,070,589 | A | * | 8/1913 | Duffing | 74/440 |
| 1,201,748 | A | * | 10/1916 | Luce | 474/156 |
| 2,862,400 | A | * | 12/1958 | Angelo | 74/460 |
| 3,548,673 | A | * | 12/1970 | Suchocki | 74/409 |
| 4,304,445 | A | * | 12/1981 | Goloff | 384/261 |
| 4,679,459 | A | * | 7/1987 | F'Geppert | 74/460 |
| 5,181,433 | A | * | 1/1993 | Ueno et al. | 74/409 |
| 5,295,459 | A | * | 3/1994 | Suzuki et al. | 123/90.31 |
| 5,400,672 | A | * | 3/1995 | Bunch, Jr. | 74/409 |
| 5,692,989 | A | * | 12/1997 | Kamlukin | 475/346 |
| 6,883,397 | B2 | * | 4/2005 | Kimizuka | 74/462 |
| 2004/0069086 | A1 | * | 4/2004 | Thoma | 74/443 |

FOREIGN PATENT DOCUMENTS

DE    10216524    * 11/2003
JP    6-307504    * 11/1994

* cited by examiner

Primary Examiner—William C Joyce
(74) Attorney, Agent, or Firm—Christopher O. Edwards

(57) ABSTRACT

A partial gear bearing including an upper half, comprising peak partial teeth, and a lower, or bottom, half, comprising valley partial teeth. The upper half also has an integrated roller section between each of the peak partial teeth with a radius equal to the gear pitch radius of the radially outwardly extending peak partial teeth. Conversely, the lower half has an integrated roller section between each of the valley half teeth with a radius also equal to the gear pitch radius of the peak partial teeth. The valley partial teeth extend radially inwardly from its roller section. The peak and valley partial teeth are exactly out of phase with each other, as are the roller sections of the upper and lower halves. Essentially, the end roller bearing of the typical gear bearing has been integrated into the normal gear tooth pattern.

11 Claims, 18 Drawing Sheets

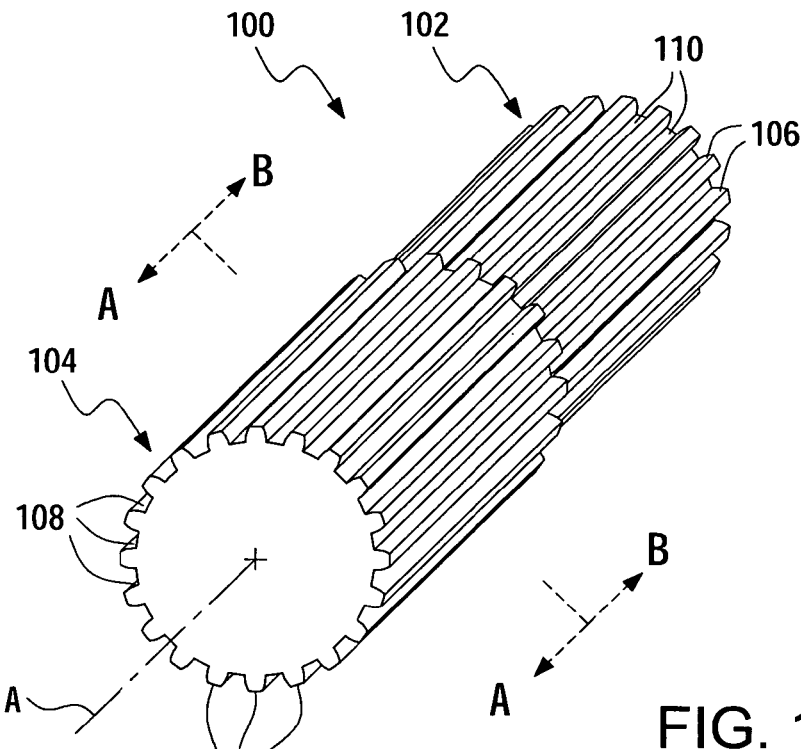
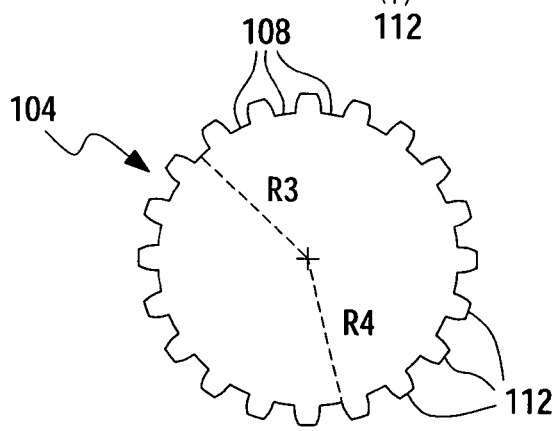
FIG. 1A
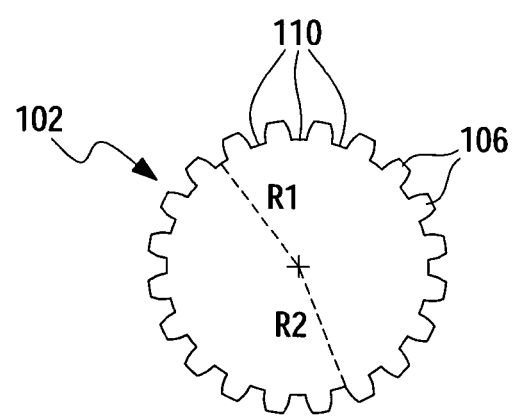
FIG. 1B
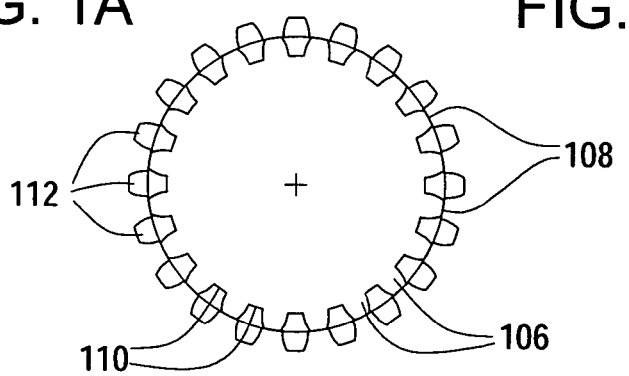
FIG. 1C

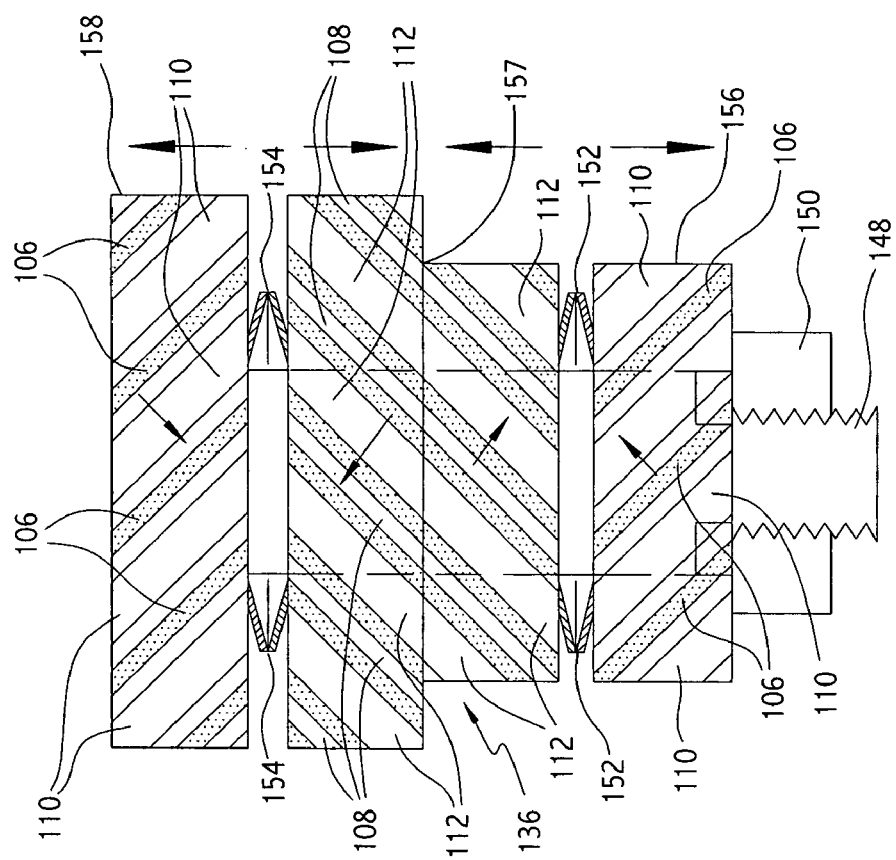
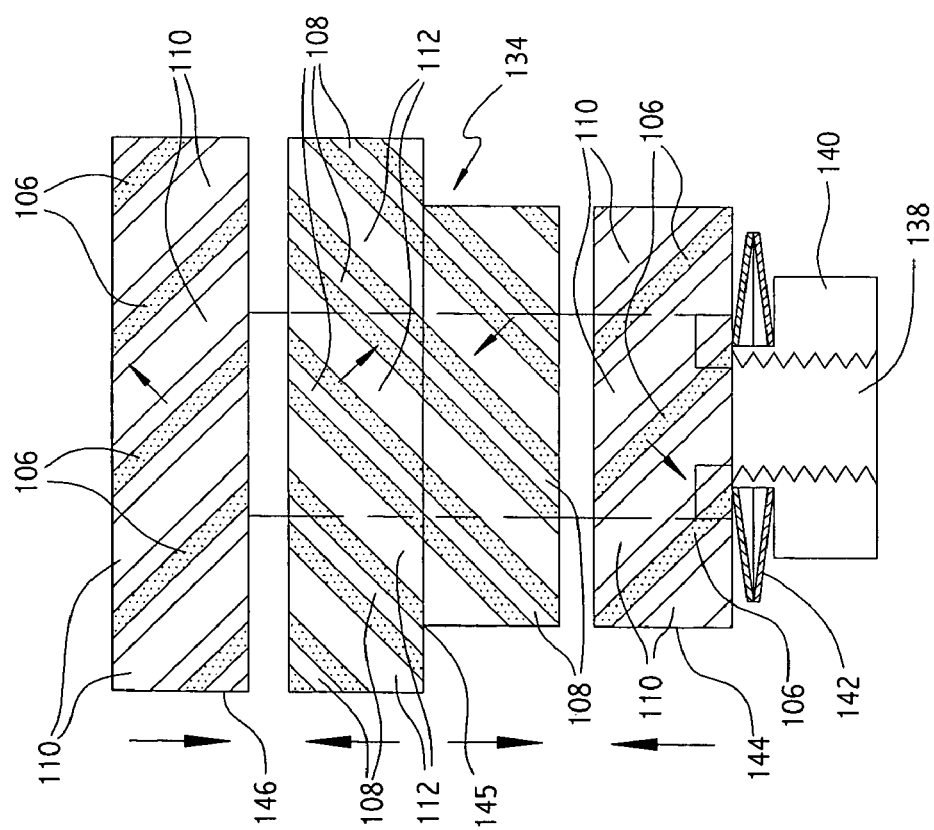

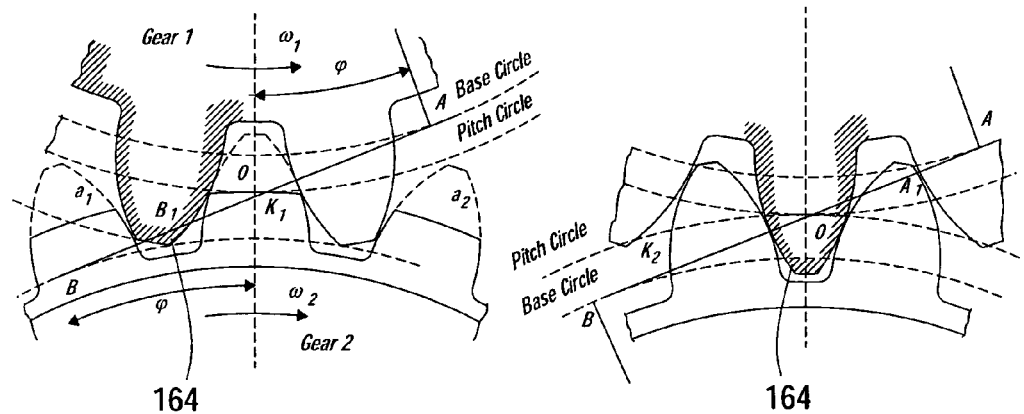
FIG. 7A
Prior Art
FIG. 7B
Prior Art
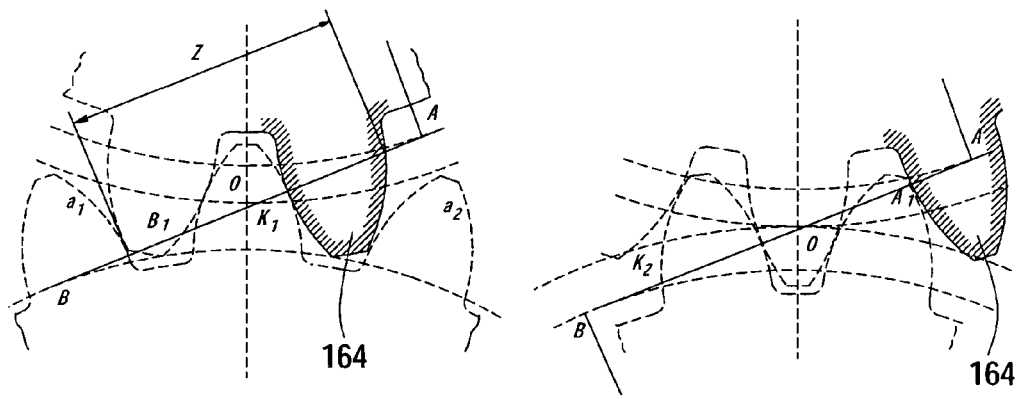
FIG. 7C
Prior Art
FIG. 7D
Prior Art

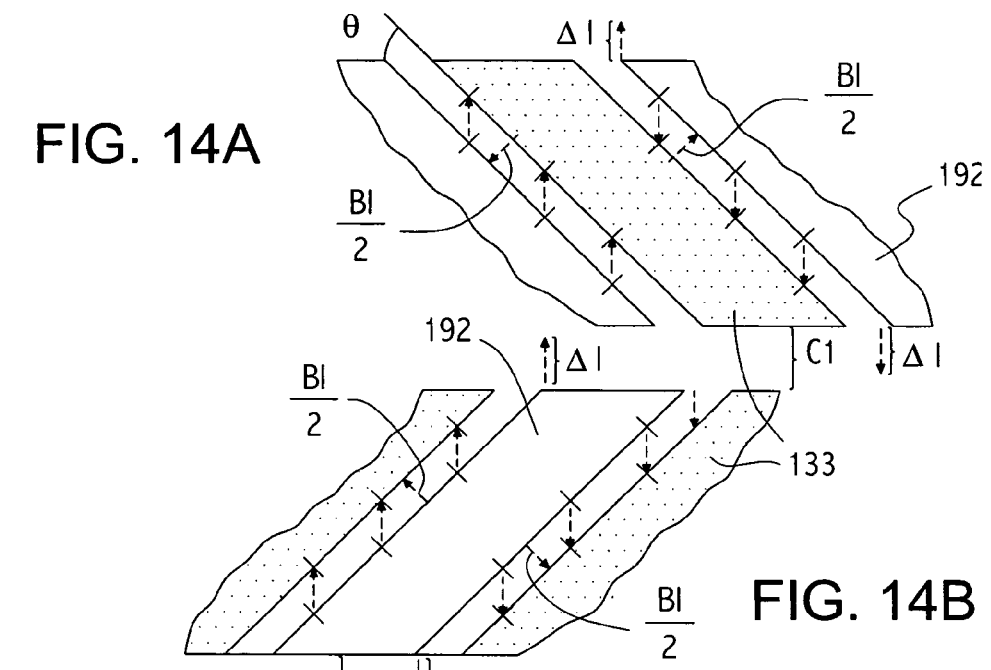
FIG. 14A
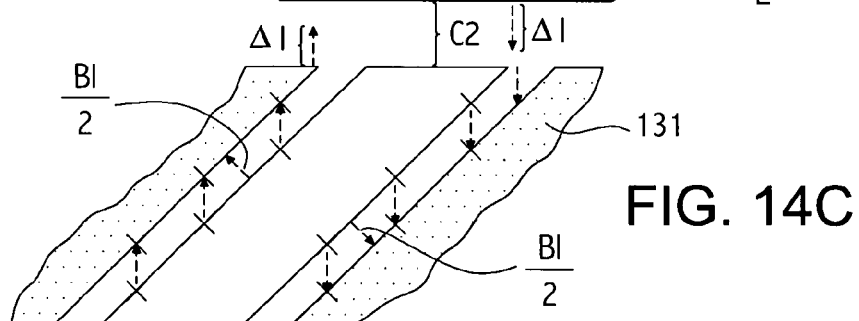
FIG. 14B
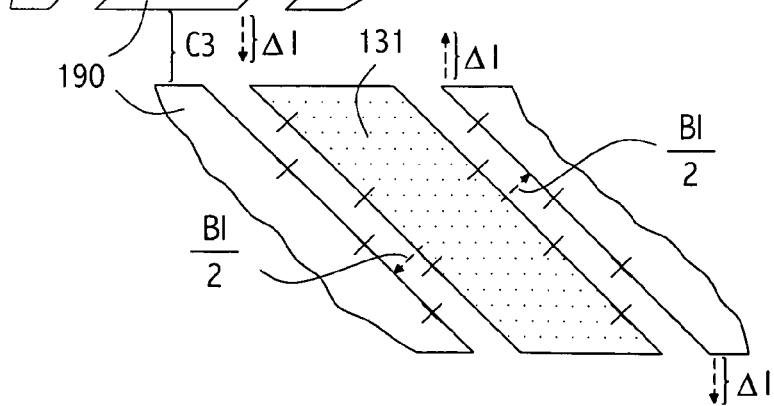
FIG. 14C
FIG. 14D

PARTIAL TOOTH GEAR BEARINGS

CROSS-REFERENCE TO RELATED APPLICATIONS

This application is a continuation of co-pending patent application Ser. No. 10/789,031, filed on Feb. 26, 2004, now abandoned which formalizes and incorporates by reference Provisional Application Ser. No. 60/453,338, "Half Tooth Gear Bearings," John M. Vranish, filed on Feb. 27, 2003. Applicant hereby claims the priority date of Feb. 27, 2003 under 35 U.S.C. 119(e).

ORIGIN OF THE INVENTION

This invention was made by an employee of the United States Government and may be used by or for the Government for governmental purposes without the payment of any royalties thereon or therefore.

BACKGROUND OF THE INVENTION

1. Field of Invention

This invention relates generally to the field of gear bearings and more specifically to a novel, inexpensive approach to distribute non-axial forces applied to a gear bearing without the use of a separate roller.

2. Background of the Invention

Gear bearings have become known in the art. Specifically, U.S. Pat. No. 6,626,792, to John M. Vranish, inventor of this invention, entitled Gear Bearings, discloses a novel system that performs both gear and bearing functions simultaneously. This is accomplished by providing first and second interacting gears, each having a plurality of teeth. Each of these gears is capped by an end roller, which has a radius equal to that of the pitch radius of the gear. Further, each gear tooth has a curved crown, or transition, which extends from the end of the tooth to the end roller. Importantly, the radius of the crown is the same as the end roller radius and the pitch radius. Because these three radii are identical, they move together at the same speed.

During interaction, the crown of each gear interfaces with the end roller of the other and the teeth of each gear interact with the teeth of the other at contact points, which are located at the pitch radius.

This alignment may be applied in any number of different configurations, for example a planetary system in which three or more planetary gears surround and interact with a central sun gear. The planets in turn are surrounded by and interact with a ring gear, which, not surprisingly, has corresponding teeth, crown and end roller. And the pitch radius of the ring gear, the radius of the crown and the radius of the ring end roller are the same.

A main purpose of the end roller in this embodiment of the gear bearing is to facilitate smooth rotation of the gears, i.e. prevent binding and act as a bearing, especially when a non-axial load is acting against the gear bearing. For example, when a non-axial load is applied to a gear bearing, the resulting deformation, tiny though it may be, may cause the interacting teeth to contact each other at locations other than the intended contact points at the designed radius. This variation of the intended contact points causes the gear bearing to experience increased friction, bind up and possibly even jam. The addition of an end roller prevents the teeth from engaging each other in a manner in which binding can occur.

BRIEF DESCRIPTION OF THE INVENTION

The presently preferred partial gear bearing includes an upper half, comprising radially outwardly extending peak partial teeth, and a lower, or bottom, half, comprising radially inwardly extending valley partial teeth. The upper half has an integrated roller surface section between each of the peak partial teeth with a radius equal to the gear pitch radius of the peak partial teeth. Conversely, the lower half also has an integrated roller surface section between each of the valley partial teeth with a radius also equal to the gear pitch radius of the peak partial teeth. The valley partial teeth extend radially inward from its roller section. The peak and valley partial teeth are exactly in phase with each other, as are the roller sections of the upper and lower halves, such that each outwardly extending gear tooth of the upper half aligns with an inwardly extending gear tooth of the lower half and each roller section of the upper half aligns with a roller section of the bottom half.

This partial tooth gear bearing interacts with other partial tooth gear bearing variants, such as ring, rack, planet or sun, to form any variety of known systems, e.g. planetary transmissions or simple power transfer gearing systems. In order to provide a proper mesh, however, the interacting partial tooth gear bearings must be constructed and arranged so that integrated roller section encounters or engages integrated roller section, and peak partial teeth mesh or engage with valley partial teeth on one half of a gear bearing while valley partial teeth engage or mesh with peak partial teeth on the other half. The corresponding parts, e.g. integrated roller sections and peak and valley partial teeth, may be substantially matching such that each partial tooth substantially fills a valley partial tooth when engaged and each integrated roller section or surface substantially fills a corresponding integrated roller section when engaged. In this manner the end roller of the prior art can be eliminated without sacrificing the important bearing function it accomplishes.

DESCRIPTION OF THE DRAWINGS

In order that the claimed invention may be better made and used by those skilled in the art, and that the best mode of carrying out the invention may be more fully appreciated, the following drawings are provided, in which:

FIG. 1 is a three dimensional view of one preferred embodiment of an isolated partial tooth gear bearing, according to an embodiment of the present invention.

FIG. 1A is a two dimensional view of the partial tooth gear bearing of FIG. 1 taken along the line A-A.

FIG. 1B is a two dimensional view of the partial tooth gear bearing of FIG. 1 taken along the line B-B.

FIG. 1C is a two dimensional end view of the partial tooth gear bearing of FIG. 1.

FIG. 5A is an overhead plan view of yet another preferred embodiment of the invention demonstrating a partial tooth herringbone planetary system with anti-backlash features for clockwise motion.

FIG. 5B is an overhead plan view of still a different preferred embodiment of the invention demonstrating a partial tooth herringbone planetary system with anti-backlash features for counterclockwise motion.

FIGS. 7A-7D illustrate sequentially the traditional number of pairs of teeth in contact while a tooth is passing through the contact zone.

FIGS. 14A-14D are schematic representations that illustrate rattle and clearances for the herringbone planetary system of the type shown in FIG. 4B.

DETAILED DESCRIPTION OF THE PREFERRED EMBODIMENTS

Figure 2A:
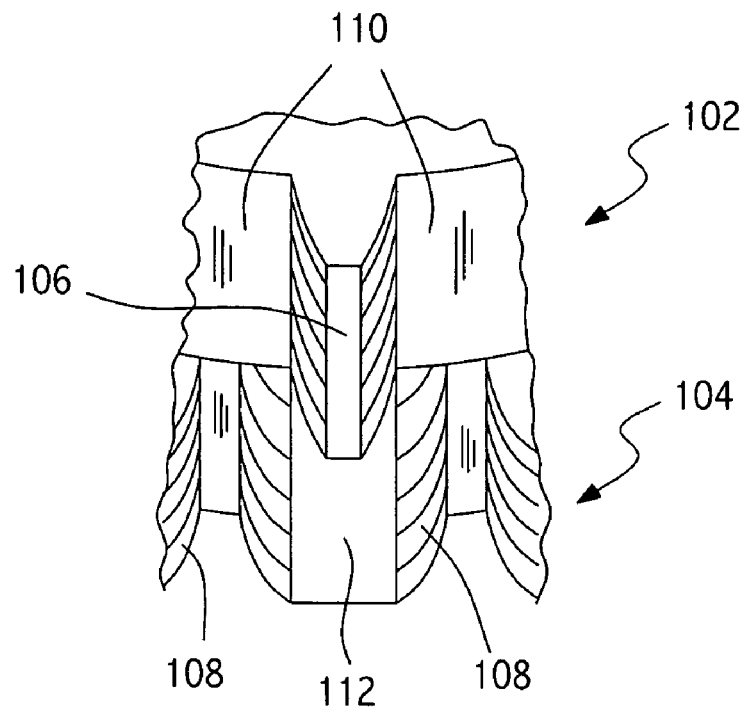
FIG. 2A is a three dimensional cutaway view of the partial tooth peaks and valleys of a partial tooth gear bearing according to another embodiment of the present invention.
Figure 2B:
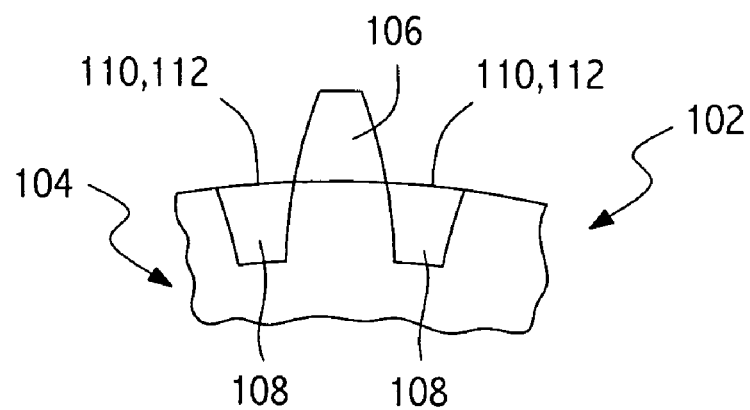
FIG. 2B is a two dimensional cutaway view of FIG. 2A.

Reference is now made to the drawings, in which like numbers are used to designate like features throughout. The general purpose of this invention is to significantly improve off-the-shelf roller bearing system performance capabilities in a cost-effective manner. Due to the large numbers of traditional roller bearing systems in existence and due to the simplicity and low cost of the add-ons and, finally, due to the amount of performance improvement experienced, this invention represents a significant improvement in the art of gear bearings.

Half Tooth Gear Bearing Construction

A preferred embodiment of a spur partial tooth gear bearing 100 (see FIGS. 1, 1A through 1C) includes an upper half 102, comprising peak partial teeth 106, and a bottom or lower half 104, comprising valley partial teeth 108. The upper half 102 with peak partial teeth 106 has a roller section 110 integrally disposed between each of the peak teeth 106, the radius R1 of which is the same as that of the upper half gear pitch radius R2, and the peak teeth 106 extend radially outwardly from the roller surface sections 110. The lower half 104, using valley partial teeth 108, includes a roller surface section 112 integrally disposed between each of the radially inward directed valley teeth 108. The radius R3, shown in FIG. 1A, matches that of the lower half 104 gear pitch radius R4. Note that the gear teeth 106 of the upper half 102 extend outwardly, while the gear teeth 108 of the lower half 104 extend inwardly.

Figure 3A:
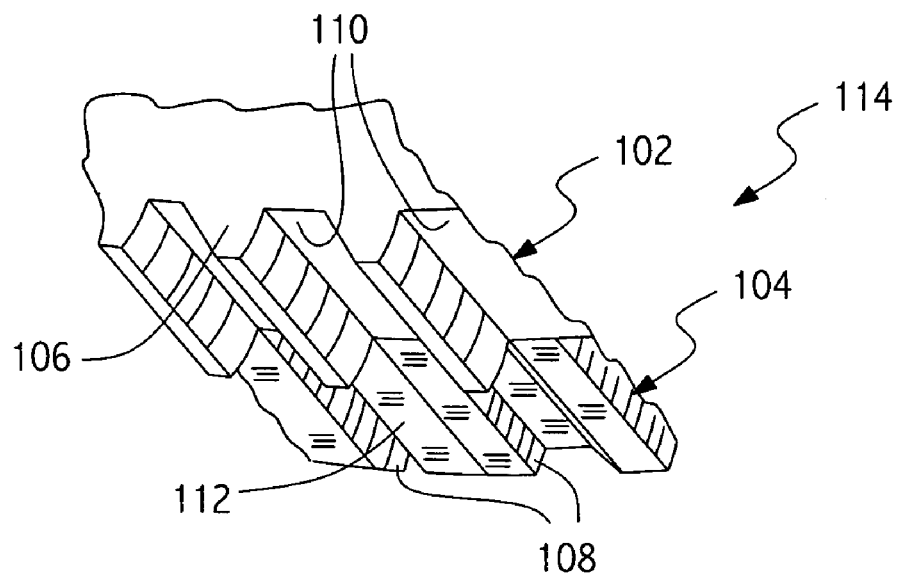
FIG. 3A is a three dimensional cutaway view of a helical partial tooth gear bearing.
Figure 3B:
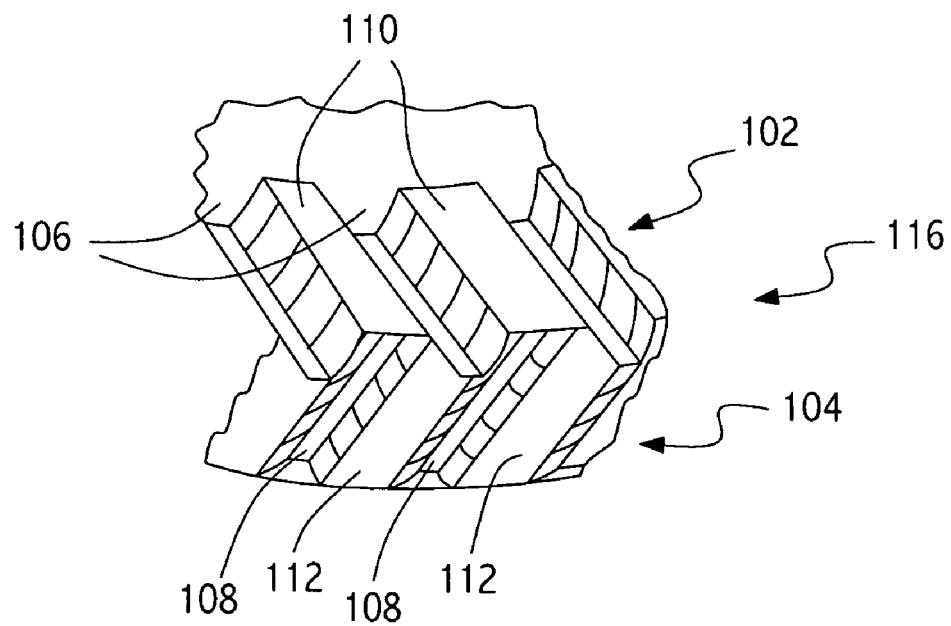
FIG. 3B is a three dimensional cutaway view of a herringbone partial tooth gear bearing.

The peak and valley teeth 106 and 108, respectively, are exactly in phase with each other, as best shown in FIG. 1. The roller sections 110 and 112 of the upper and lower halves 102 and 104, respectively, are also exactly in phase with respect to each other. Thus, looking at the bottom view as shown in FIG. 1C, we see a gear system with a complete classical/typical tooth pattern and a complete roller at the gear pitch radius of the classical/typical tooth pattern. We have, in effect, integrated a roller into the gear teeth to form a gear bearing. FIG. 3A shows this approach as applied to a single helical partial tooth gear bearing 114 and FIG. 3B shows this approach when applied to double helical or herringbone partial tooth gear bearings 116.

It will be clear to one skilled in the art, however, that a partial gear bearing having two halves is only one embodiment of the present invention and that many other designs may be incorporated while remaining within the scope of this invention. For example, the partial gear bearing need not be separated into two halves. The invention may comprise first and second interacting partial gear bearings, each having a plurality of gear teeth, between which first and second roller surfaces, respectively, are disposed. In this configuration the first and second partial gear bearings interact with each other such that alternately, during rotation of the partial gear bearings, the first and second roller surfaces contact each other and the gear teeth of the first partial gear bearing mesh with the gear teeth of the second partial gear bearing.

The partial tooth gear bearings 100, 114 and 116, described above, interact with other standard gear bearing variants (ring, rack, planet, sun) to form any variety of systems, for example planetary transmissions or simple power transfer gearing systems. To provide a proper interaction, or mesh, of teeth, however, the partial tooth gear bearings must be constructed and arranged so that an upper roller 110 on one gear encounters a lower roller 112 on another gear, peak partial teeth 106 on the upper half 102 of one gear mesh with valley partial teeth 108 on the lower half 104 of the other gear, and valley partial teeth 108 on the lower half 104 of the first gear mesh with peak partial teeth 106 on the upper half 102 of the second gear.

Figure 4B:
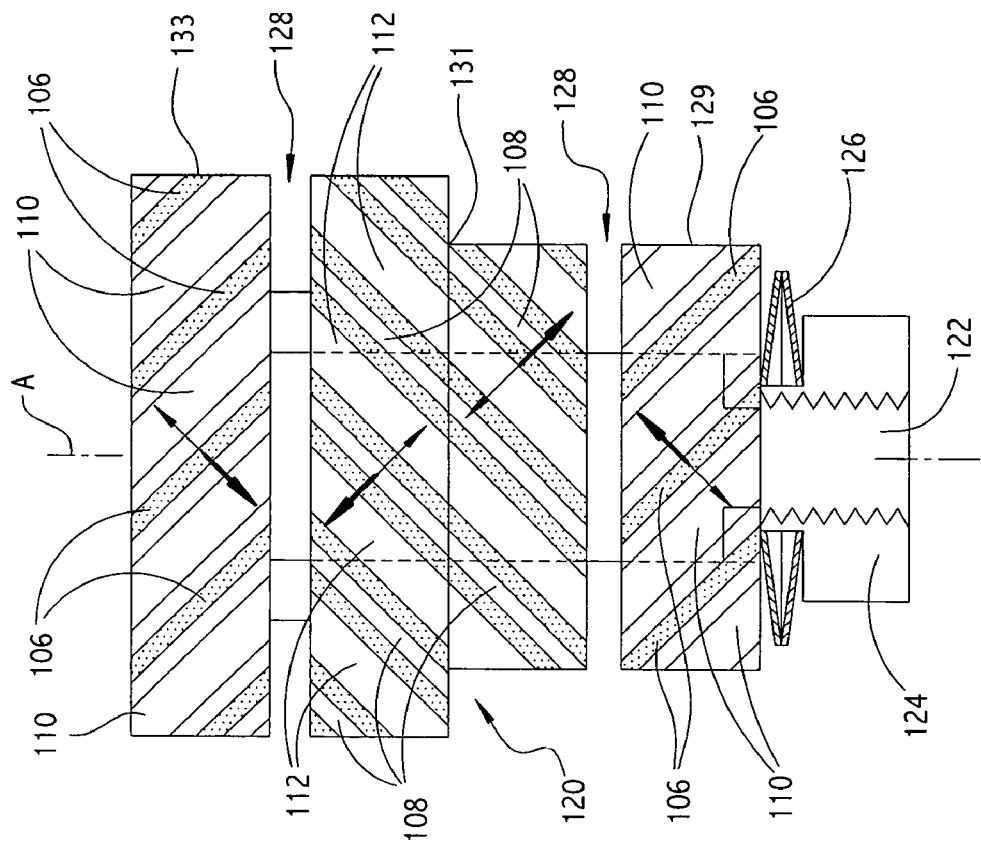
FIG. 4B is an overhead plan view of still another preferred embodiment of the present invention illustrating a partial tooth herringbone planetary system
Figure 4A:
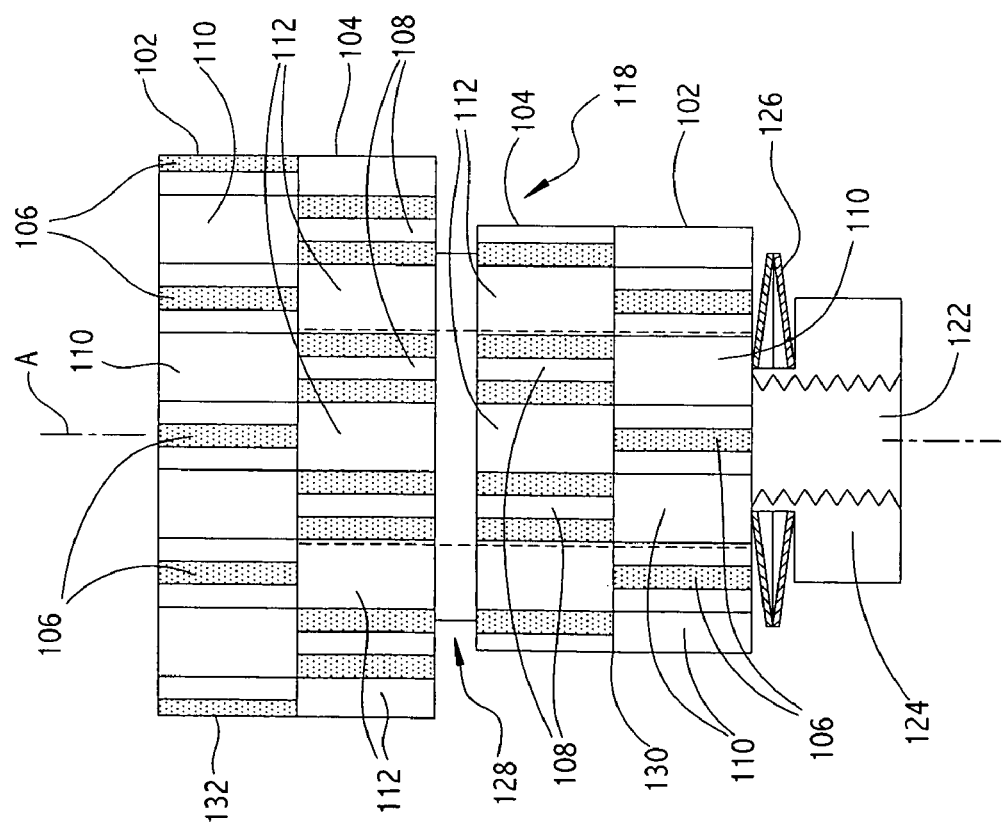
FIG. 4A is an overhead plan view of another preferred embodiment of the present invention illustrating a partial tooth spur planetary system.
Figure 6A:
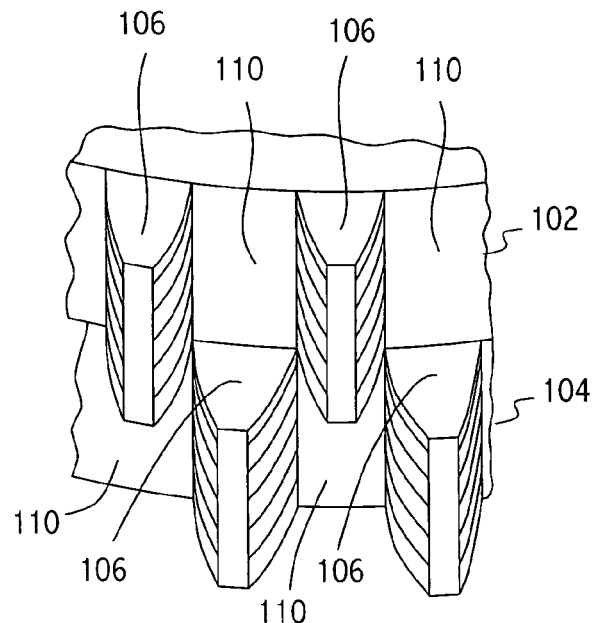
FIG. 6A is a three dimensional cutaway view of a further preferred embodiment of a partial mesh, partial tooth gear bearing illustrating tooth peaks.
Figure 6B:
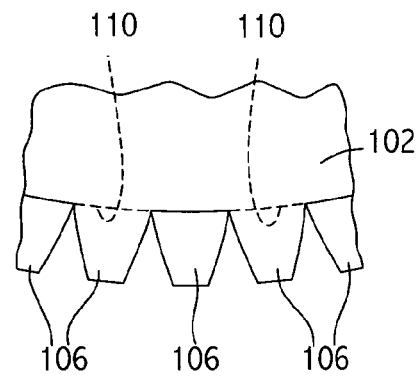
FIG. 6B is a two dimensional cutaway view of the embodiment of FIG. 6A.
Figure 6C:
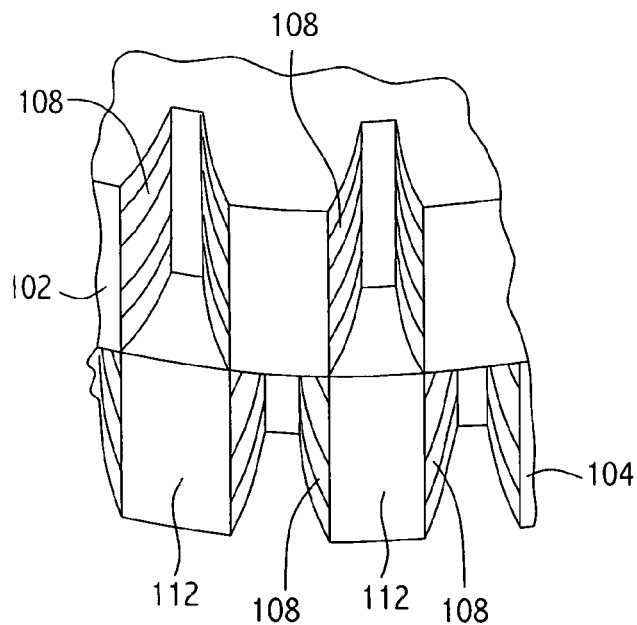
FIG. 6C is a three dimensional cutaway view of yet a further embodiment of partial mesh, partial tooth gear bearing illustrating tooth valleys.
Figure 6D:
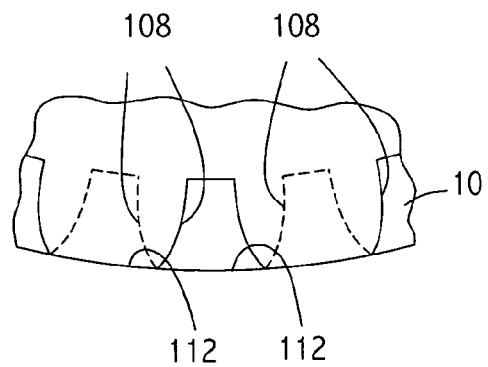
FIG. 6D is a two dimensional cutaway view of the embodiment of FIG. 6C.

FIG. 4A shows an example of a partial tooth gear bearing planet 118 using spur gear teeth, which are at right angles to the axis of rotation A of the planet 118. FIG. 4B illustrates an example of a partial tooth gear bearing planet 120 using herringbone gear teeth, which are at an angle diagonal to the axis of rotation A. In both FIGS. 4A and 4B, the assembly includes a central shaft 122 about which the planet rotates, a nut 124 rotatably secured to the shaft 122 for preventing axial sliding of the planet components, and a spring or lock washer 126 to lock the nut 124 in place. Further, a stop or gap 128 separates the first half 130 of the planet 118 from the second half 132 in FIG. 4A. As shown in that FIG. 4A, each half 130 and 132, respectively, in turn includes an upper half 102 and a lower half 104. Accordingly, peak and valley partial teeth 106 and 108, respectively, and integrated roller sections 110 and 112 are placed as shown. Similarly, FIG. 4B shows the stops 128 separating a lower partial tooth helical gear bearing 129 from a middle partial tooth helical gear bearing 131, and the middle gear bearing 131 from an upper partial tooth helical gear bearing 133. One skilled in the art will recognize that other alignments of gear teeth fall within the scope of this invention as designated by the claims and therefore the illustrations shown are by way of example only.

FIGS. 5A and 5B show two variations of partial tooth gear bearing planets 134 and 136, respectively, designed for planetary transmission anti-backlash operations. FIG. 5A includes a central shaft 138 and a securing nut 140, and uses a spring washer 142 to pull the upper, middle and lower partial tooth sections 144, 145 and 146, respectively, to preload one set of planets for anti-backlash clockwise motions. Conversely, FIG. 5B, which has central shaft 148 and securing nut 150, uses two strategically placed spring washers 152 and 154 to spread the upper, middle and lower partial tooth sections 156, 157 and 158, respectively, to preload a separate set of planets for anti-backlash counterclockwise motions. The two sets of planets 134 and 136 are designed to operate in a single planetary transmission to provide anti-backlash operation in both axial directions. FIGS. 6A through 6D show a partial mesh, partial tooth gear bearing variant. This variant comes in two different forms, namely, tooth peaks (both upper half 102 and lower half 104) 106, shown on FIGS. 6A and 6B, and tooth valleys (both upper half 102 and lower half 104) 108, shown in FIGS. 6B and 6C. There are specific advantages to using this form of gear bearing which will be discussed later.

Partial Tooth Gear Bearing Operation

FIGS. 7A through 7D show the number of pairs of teeth in contact while a tooth is passing through the contact zone in a standard gear operation. In FIG. 7A the cross-hatched tooth 164 is just entering the contact zone at B1 where the addendum circle crosses the line of action. AB. Another pair is already in contact at K1 so that the load is being carried by two pairs between FIGS. 7A and 7B. However, in FIG. 7B, contact is about to be broken at A1 so that between FIGS. 7B and 7C the load is carried by but a single pair. At B1 in FIG. 7C, a new pair is coming into contact so that this contact and the one at K1 carry the load to FIG. 7D, where the tooth 164 is will leave the contact zone as soon as the contact at A1 is broken. The entire load will then be carried by K2 until the process begins over again as in FIG. 7A.

Table I describes the partial tooth gear bearing operational sequence for spur gears and compares it directly to the classical FIG. 7 operation.

TABLE I

PARTIAL TOOTH GEAR BEARING OPERATIONAL SEQUENCE
[SPUR GEARS] [(a) Represents one Partial Tooth Gear Bearing (b) is its mating/meshing counter part]

| TOP HALF | BOTTOM HALF | COMPOSITE |
|---|---|---|
| 1) Peak (a) (meshes with) Valley (b) | Roller (a) (contacts) Roller (b) | Peak/Valley Gear Mesh Roller/Roller Bearing Action |
| 2) Roller (a) (contacts) Roller (b) | Valley (a) (meshes with) Peak (b) | Valley/Peak Gear Mesh Roller/Roller Bearing Action |
| 3) Peak (a) (meshes with) Valley (b) | Roller (a) (contacts) Roller (b) | Peak/Valley Gear Mesh Roller/Roller Bearing Action |
| 4) Roller (contacts) Roller (b) | Valley (a) (meshes with) Peak (b) | Valley/Peak Gear Mesh Roller/Roller Bearing Action |

COMPOSITE SEQUENCE SUMMARY
1) PEAK/VALLEY
2) VALLEY/PEAK
3) PEAK/VALLEY
4) VALLEY/PEAK

Steps 1) thru 4) constitute a Full Tooth Mesh Sequence which duplicates a classical Tooth Mesh Sequence. There is continuous Roller/Roller Bearing Action Throughout.

Partial Mesh, Partial Tooth Gear Bearing Operations

As indicated earlier, FIG. 6 shows partial mesh, partial tooth gear bearing construction. FIGS. 7A through 7D show the contacts between gear teeth while a tooth is passing through the contact zone for classical, typical gear meshes.

Figure 8A:
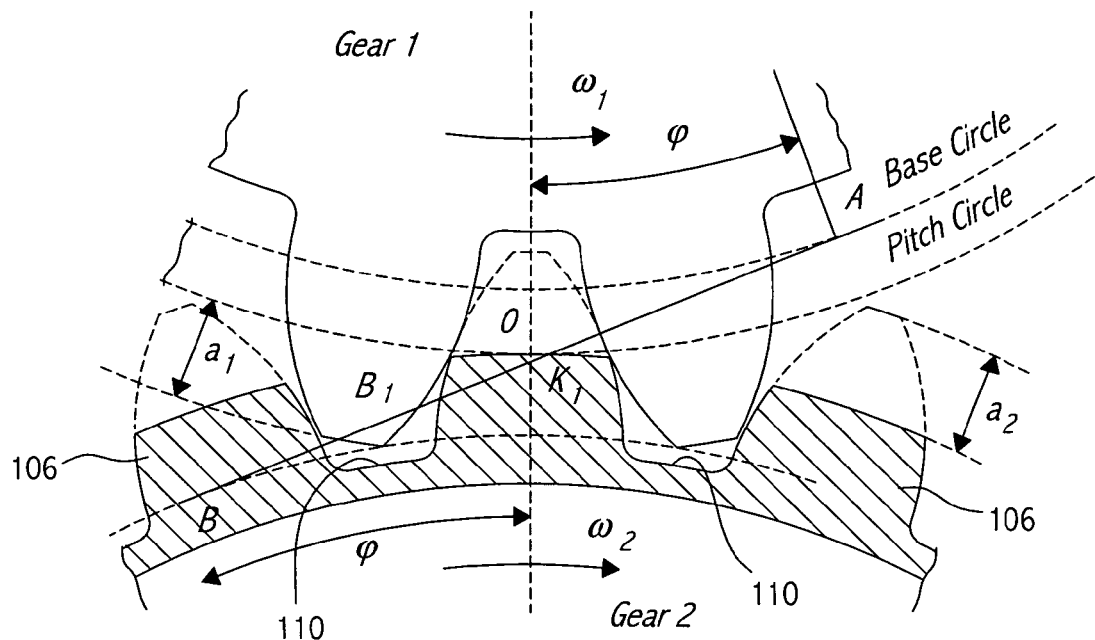
FIGS. 8A and 8B illustrate partial mesh, partial tooth sequential interactions of the present invention in contrast to FIGS. 7A-7D.
Figure 8B:
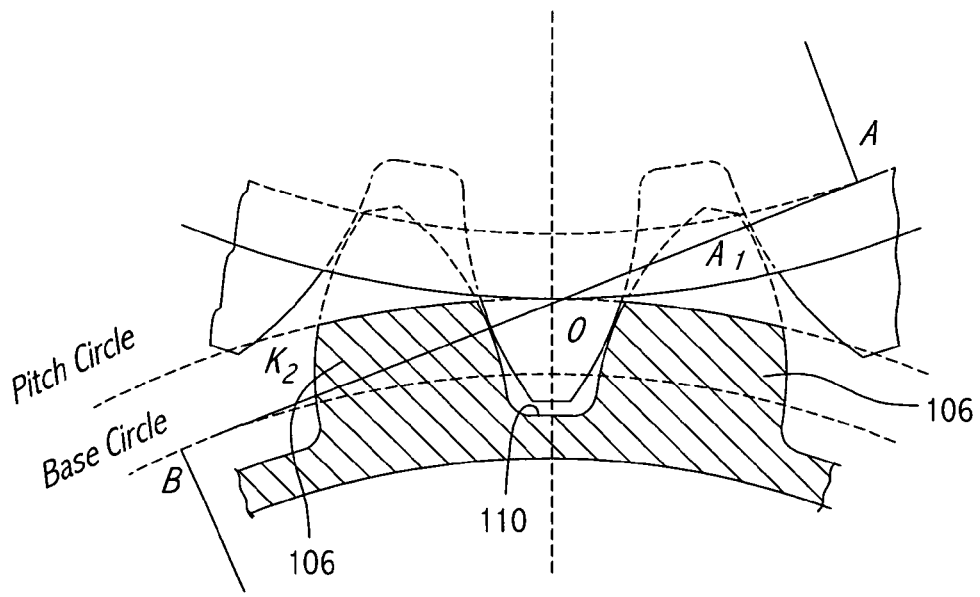

FIGS. 8A and 8B show these contacts for a partial mesh, partial tooth gear bearing interaction. Table II compares the tooth interactions of FIGS. 7 and 8.

TABLE II

COMPARISON OF GEAR TOOTH INTERACTIONS

| TYPICAL FULL TOOTH INTERACTIONS | PARTIAL MESH/PARTIAL TOOTH INTERACTIONS |
|---|---|
| 1) From (a) thru (d) Gear 1 moves 3 Tooth Positions | 1) From (a) thru (d) Gear 1 moves 3 Tooth Positions |
| 2) Contact Area moves from B1 to K2 to 0 to K1 to A1. | 2) Contact Area moves from B1 to K2 to 0. [K1 to A1 do not contact]. |
| 3) 2 Contact Points in each of the 4 Tooth Positions | 3) Gear 1 Upper Tooth [(a) in FIG. 8] has 1 Contact Point B1. Gear 1 Lower Tooth [(a') in FIG. 8] has 1 Contact Point K2. |
| 4) Positions (a) thru (d) represent 2 Cycles. | 4) When Gear 1 moves to (b) it's Upper Tooth Contacts at K2. It's Lower Tooth moves to (b') where it contacts at A1. |
| | 5) The Cycle Continues with 2 Contact Points in each position. |
| | 6) One(1) Tooth Position Per Cycle |
| | 7) Positions (a) thru (d) Represent 4 Cycles. |

COMPOSITE SEQUENCE SUMMARY
1) PEAK UPPER 1/VALLEY UPPER 2 (B1 to K2 Contact)
PEAK LOWER 1/VALLEY LOWER 2 (K2 to B1 Contact)
2) PEAK UPPER 1/VALLEY UPPER 2 (K2 to B1 Contact)
PEAK LOWER 1/VALLEY LOWER 2 (B1 to K2 Contact)

Steps 1) and 2) constitute two (2) Partial Tooth/Partial Mesh Steps, which are the equivalent of a classical Tooth Mesh Sequence. There is continuous Roller/Roller Bearing Action Throughout.

Figure 9:
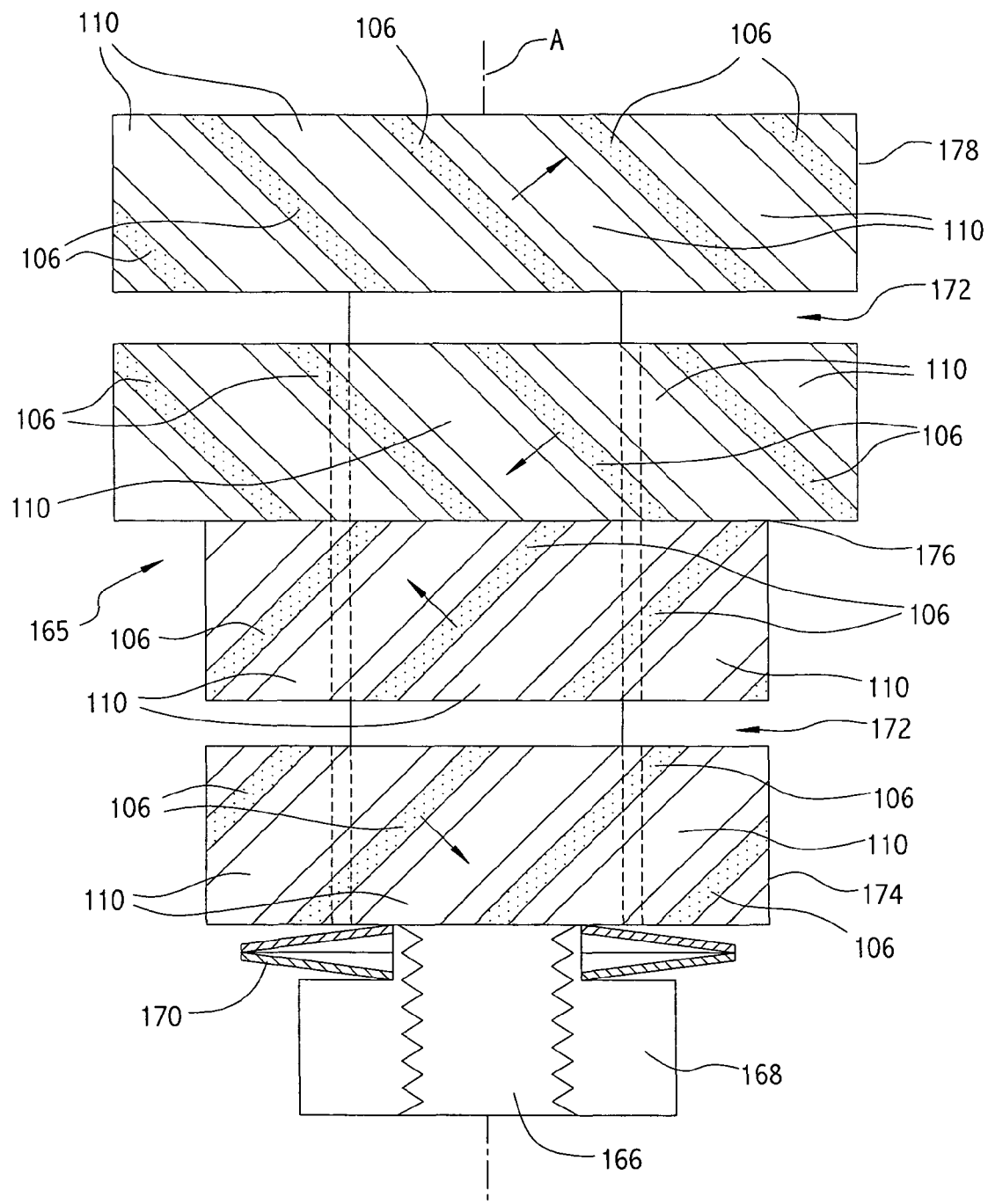
FIG. 9 is an overhead plan view of another preferred embodiment of the present invention demonstrating a partial mesh, partial tooth planetary system with anti-backlash features.

FIG. 9 shows an anti-backlash planet 165 using the partial mesh, partial tooth configuration first shown in FIGS. 6A through 6D. This embodiment comprises a central shaft 166 about which the planet rotates, a nut 168 rotatably secured to the shaft 166 for preventing axial sliding of the planet components, and a spring washer 170 to lock the nut 168 in place. As indicated, the planet 165 of FIG. 9 further comprises a lower partial mesh, partial tooth gear bearing 174, a middle partial mesh, partial tooth gear bearing 176, and an upper partial mesh, partial tooth gear bearing 178. Also, it is preferred that a clearance 172 be provided, as shown, to prevent binding.

As will be explained later, this is useful for anti-backlash transmissions because the construction is simple and because only three planets are required. It has a disadvantage in that the gear action contact occurs out-board from the pitch circle for the male planet members and in-board from the pitch circle for the female planet members, whereas for the full mesh, partial tooth configuration, gear contact action occurs in-board half the time and out-board half the time for an average near that of the pitch circle (or roller surface). Thus, the partial mesh, partial tooth configuration will have slightly more rubbing than the full mesh system and be slightly less efficient. But, from experience using bearings that work on a similar principle, it is expected that the partial mesh, partial tooth and the full mesh, partial tooth configurations will both be very efficient.

Figure 10:
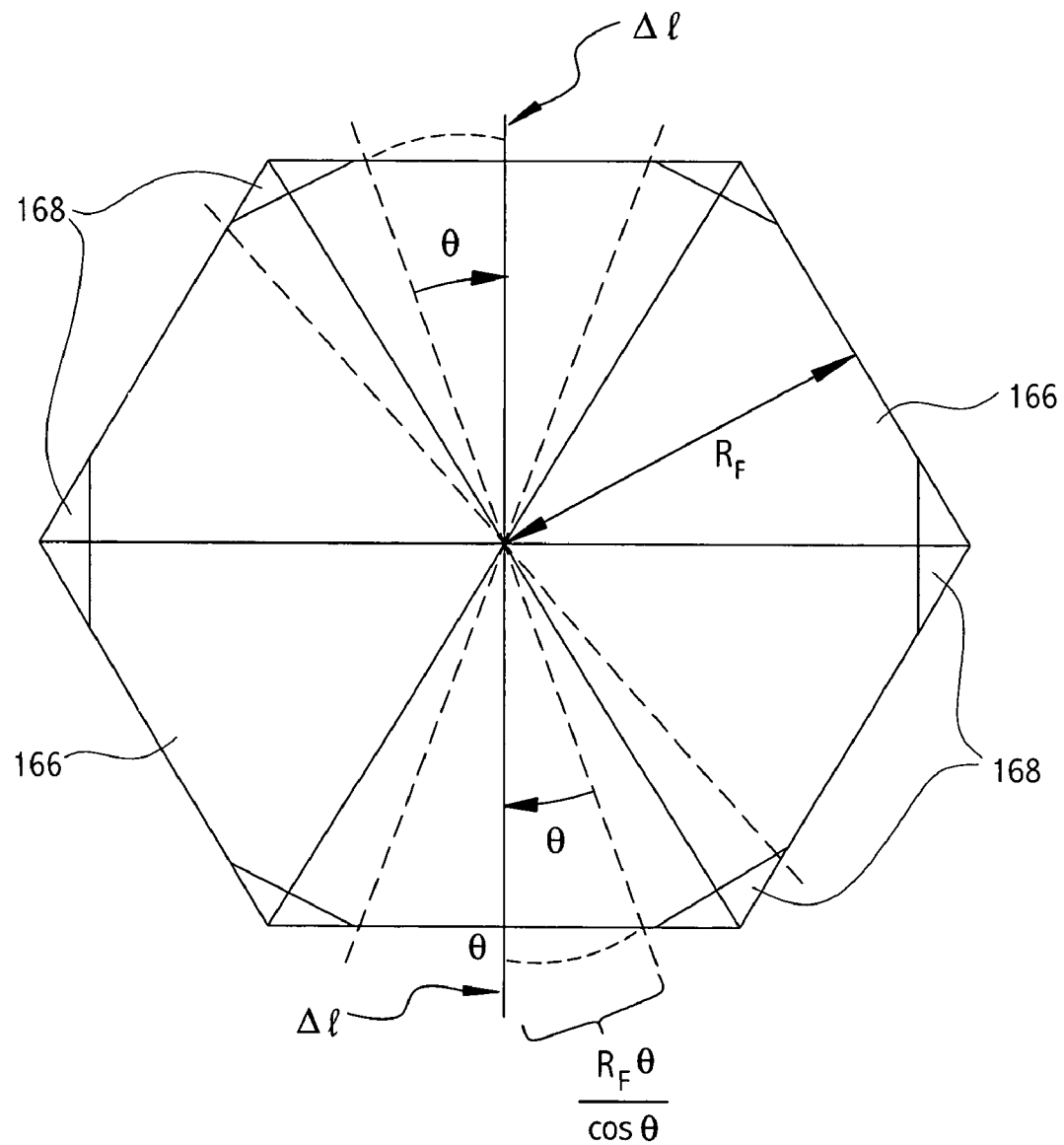
FIG. 10 is a schematic representation of a torque friction self-locking feature of the current invention.

FIG. 10 illustrates the central shaft 166 and corresponding nut 168 from an end perspective and shows a self-locking scheme according to the following equations.

$$\frac{\frac{R_F}{\cos\theta}\theta}{\frac{R_F}{\cos\theta}[1-\cos\theta]} = \frac{\theta}{[1-\cos\theta]} \quad (1)$$

$$\frac{d}{d\theta}\left\{\frac{\theta}{[1-\cos\theta]}\right\} \approx \frac{\text{Arc Length Change Rate}}{\text{Radial Deformation Rate}}$$

$$\frac{d}{d\theta}\left\{\frac{\theta}{[1-\cos\theta]}\right\} \approx \frac{F_N}{F_{Torque}}; \text{ and } F_N\mu_S = F_{Torque} \quad (2)$$

$$\frac{d}{d\theta}\left\{\frac{\theta}{[1-\cos\theta]}\right\} = (-1)[1-\cos\theta]^{-2}[\sin\theta]\theta + [1-\cos\theta]^{-1} \quad (3)$$

$$\text{For } \theta = 20 \text{ deg.; } \frac{d}{d\theta}\left\{\frac{\theta}{[1-\cos\theta]}\right\} \quad (4)$$

$$= \frac{[1-\cos\theta-\theta\sin\theta]}{[1-\cos\theta]^2}$$

$$= -16.24429$$

$$\text{Locks when } \mu_S > \frac{1}{16} \quad (5)$$

Where:
$\theta$=angle from center of hex flat to start of bevelled section as shown in FIG. 10
$R_F$=radius from center of hex to flat as shown in FIG. 10.
$\mu_S$=coefficient of friction between hex shaft and hex gear female members.

Figure 11A:
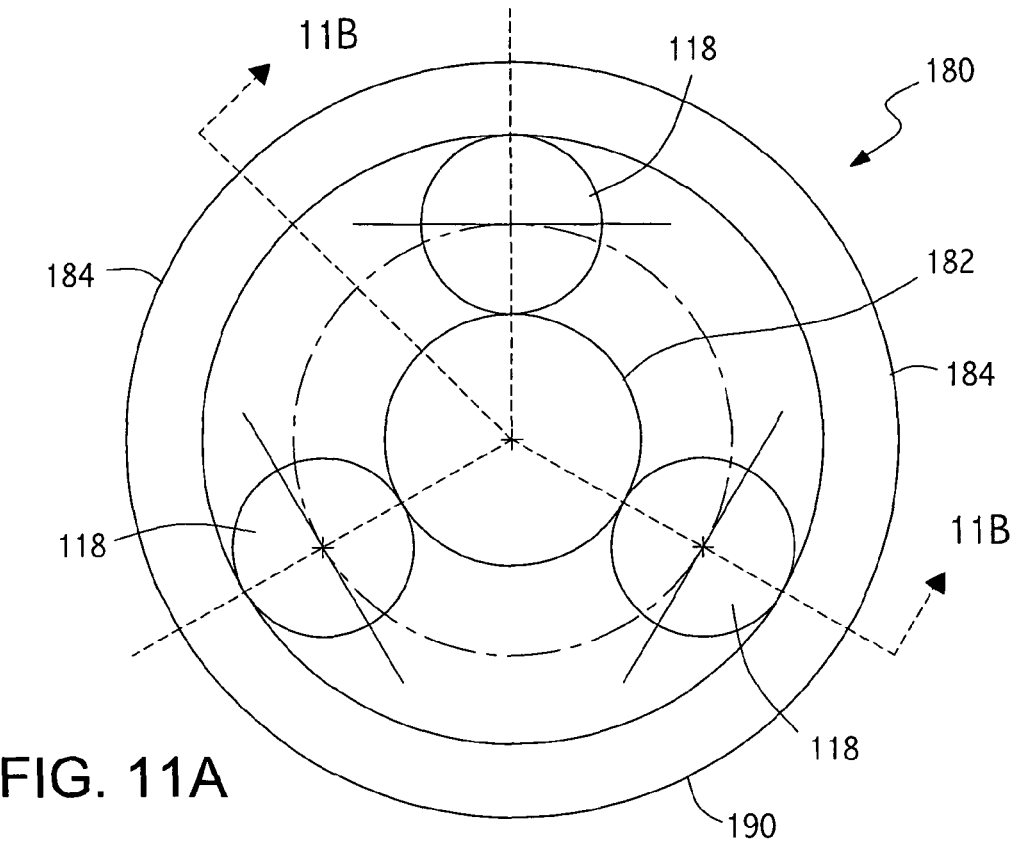
FIG. 11A is a schematic representation of a partial tooth planetary transmission utilizing spur gears.
Figure 11B:
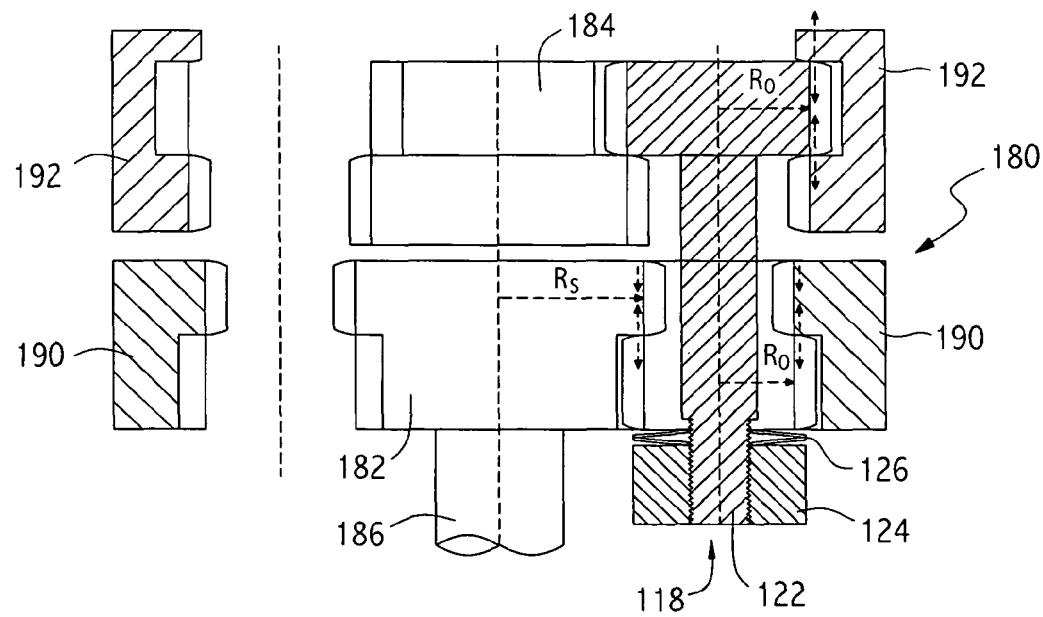
FIG. 11B is a two dimensional view of the partial tooth planetary transmission of FIG. 11A taken along the line A-A.

FIGS. 11A and 11B show a partial tooth planetary transmission 180 using the partial tooth version of spur gears. As indicated, the transmission 180 includes a sun gear 182 and corresponding idler arm 184 built about a central shaft 186, a plurality of spur planets 118 interacting with the sun gear 182, a ground ring 190 and an output ring 192. Each of the planets 188 is similar in construction and operation to that shown in FIG. 4A.

Figure 12:
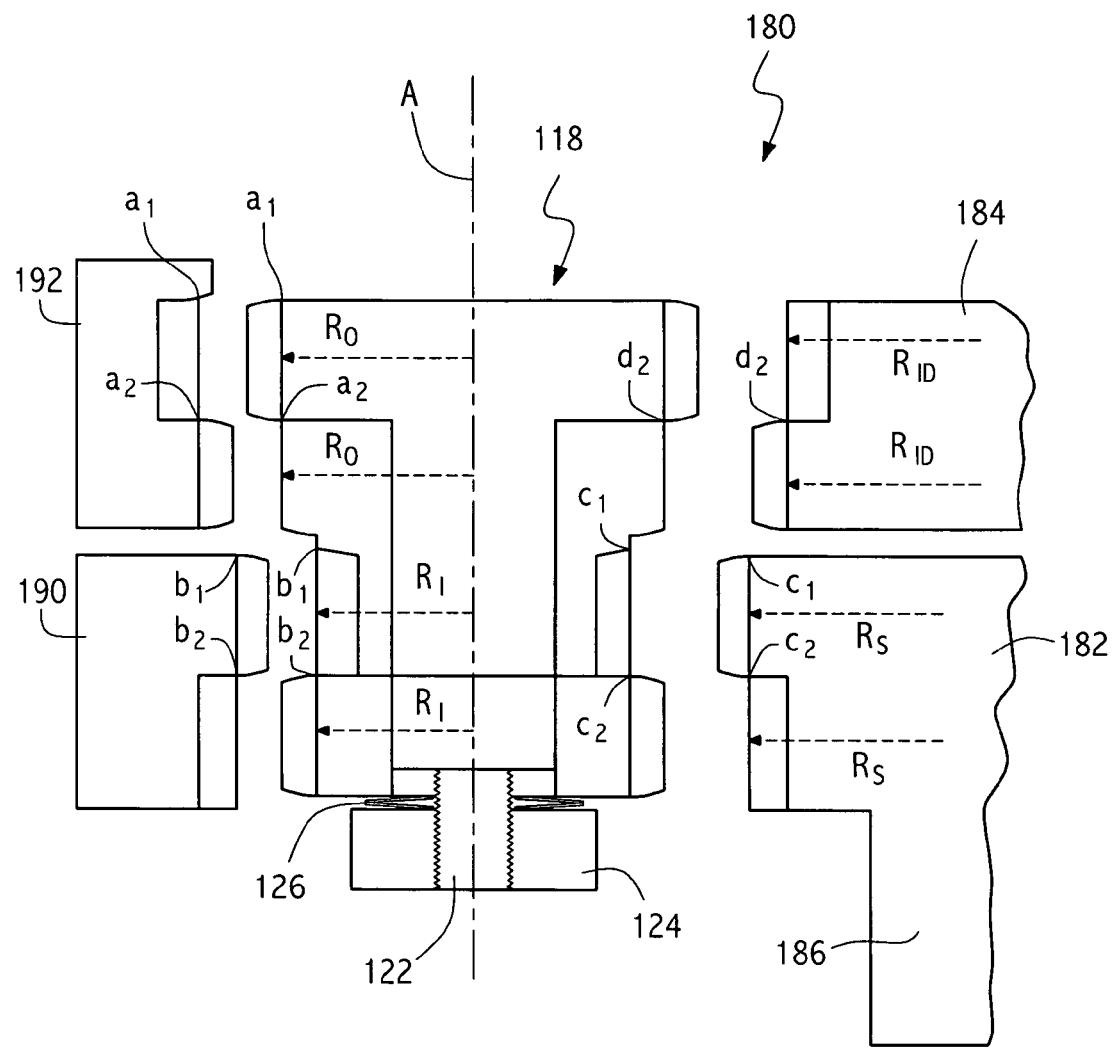
FIG. 12 is a two dimensional exploded cutaway view of the partial tooth planetary transmission of FIG. 11A illustrating contact point locations.

FIG. 12 shows the assembly scheme and the contact point locations for the transmission of FIG. 11A. Mutual contact points are labeled a1-a1, a2-a2, b1-b1, b2-b2, c1-c1, c2-c2, d2-d2. Note there is no contact for d1 since the idler arm 184 does not come under load.

Figure 13A:
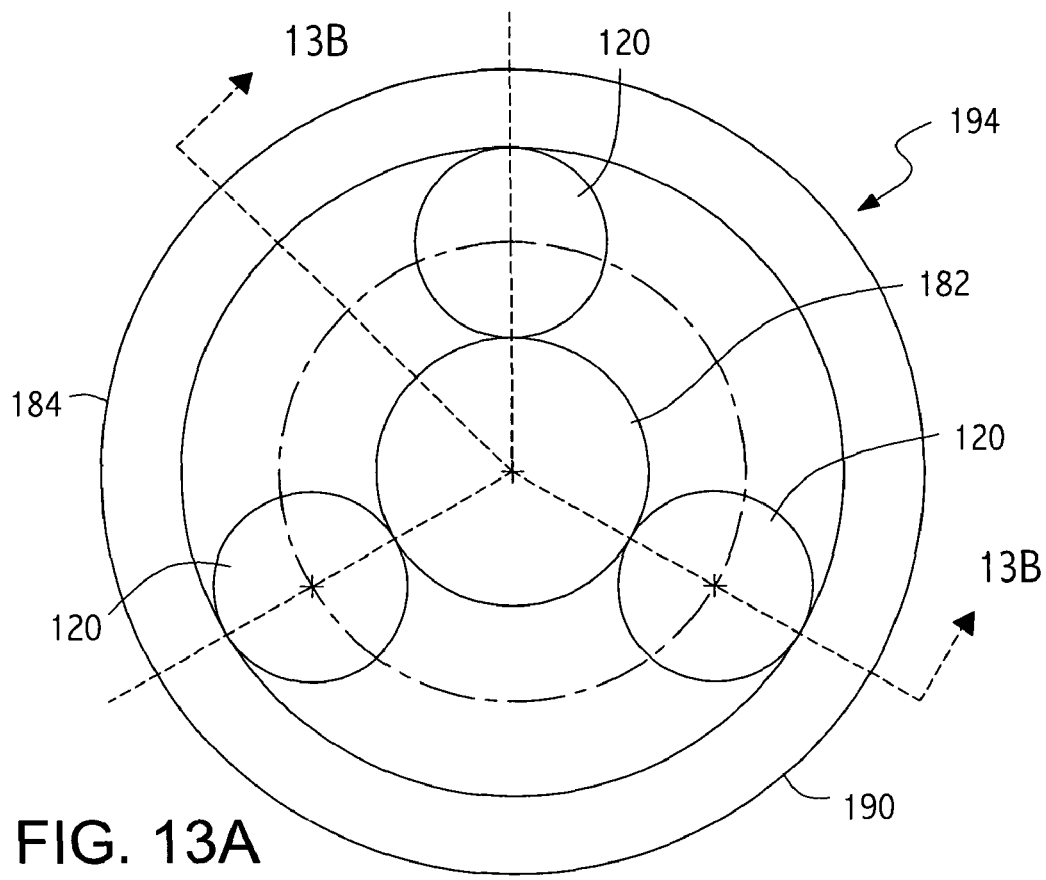
FIG. 13A is a schematic representation of a partial tooth planetary transmission utilizing helical or herringbone gears.
Figure 13B:
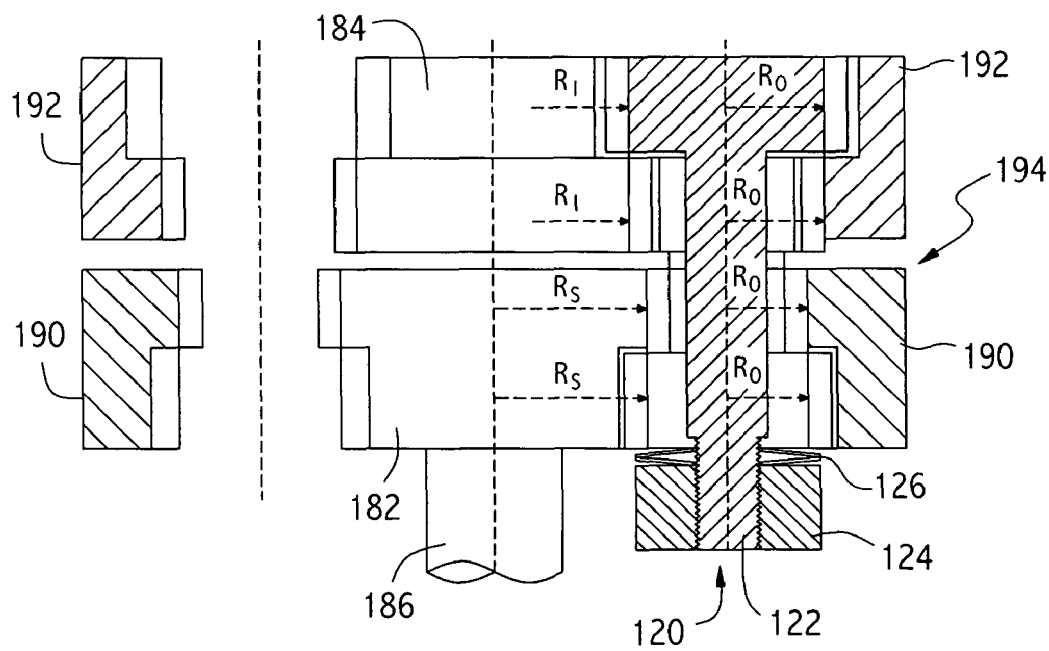
FIG. 13B is a two dimensional view of the partial tooth planetary transmission of FIG. 13A taken along the line A-A.

FIGS. 13A and 13B illustrate a partial tooth planetary transmission 194 using either single helical or double helical (herringbone) gears similar to FIGS. 11A and 11B, except that FIGS. 11A and 11B use spur gears.

FIGS. 14A to 14D show the rattle and clearances for the herringbone planets of the type shown in FIG. 4B. See Table III below.

TABLE III

Clearances, Tolerances, Seating Schedule

Let:
$\theta$ = Herringbone Tooth Angle
BL = Backlash Meshing Tooth Clearance $$\Delta L = \frac{BL}{\cos\theta}$$

= Axial Distance preload must travel to overcome Tooth Clearnce (including Backlash)

Seating Sequence

1. Upper Planet moves down (axially) $\Delta L$ in. and contacts Output Ring
2. Upper Planet and Output Ring move down together (axially) another $\Delta L$ until the Output Ring contacts the Middle Section of the Planet. Backlash is now removed from the Interfaces (Upper Planet to Output Ring and Middle Planet to Output Ring.
3. Lower Planet moves up (axially) $\Delta L$ and contacts Ground Ring.
4. Lower Planet and Ground Ring move up together (axially) another $\Delta L$ until the Ground Ring contacts the Middle Section of the Planet. Backlash is now removed from the Interfaces (Lower Planet to Ground Ring and Middle Planet to Ground Ring.
    1. & 2. and 3. & 4. occur simultaneously.
C1 represents Clearance between a). Upper and Lower Herringbone Teeth of Output Ring and b). Upper and Lower Herringbone Teeth of Planet Upper Half.
C2 represents Clearance between a). Output Ring and Ground Ring and b). Upper and Lower Herringbone Teeth of Planet Lower Half.
C3 represents Clearance between a). Upper and Lower Herringbone Teeth of Ground Ring and b). Upper and Lower Herringbone Teeth of Planet Lower Half.
$\Delta L$ represents Rattle (axial direction). BL represents Gear Backlash. $\theta$ is the Herringbone Tooth Angle. C1, C2, C3>2$\Delta L$ to insure Tooth to Tooth Preload Contacts throughout with no other Interferrences.

Figure 15A:
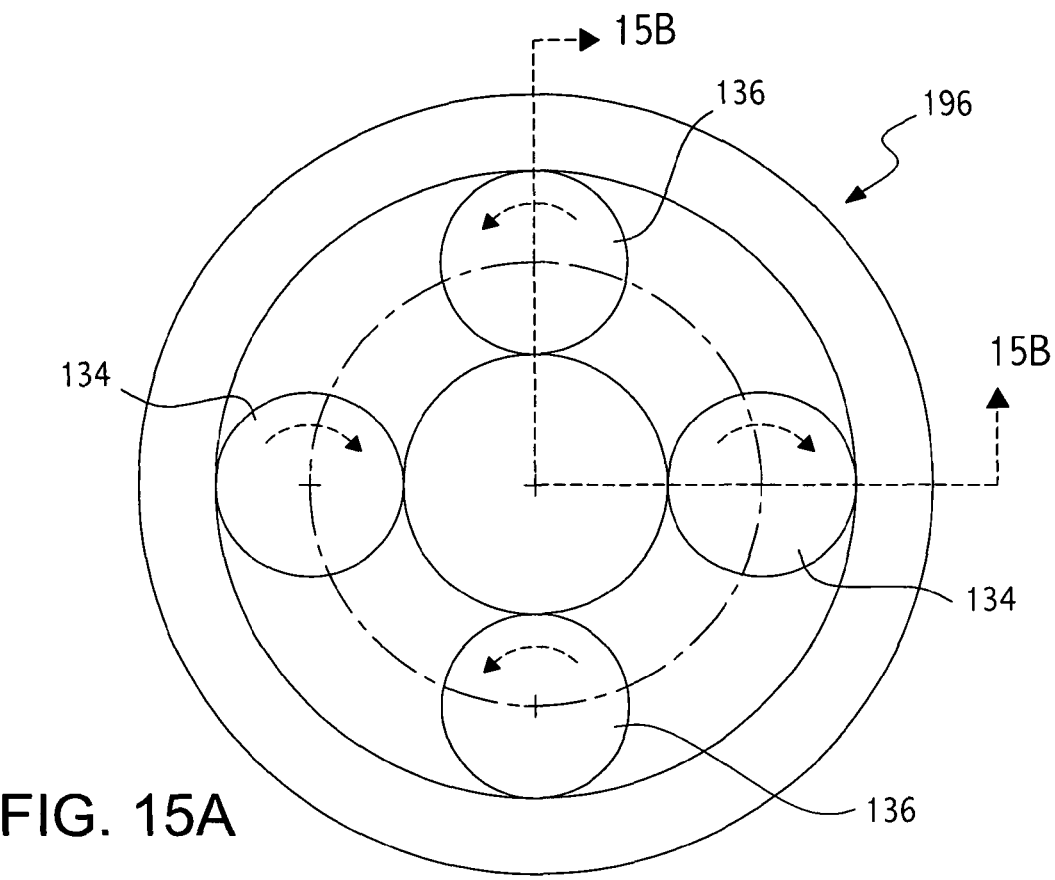
FIG. 15A is a schematic representation of a partial tooth anti-backlash planetary transmission for herringbone planets of the type shown in FIGS. 5A and 5B.
Figure 15B:
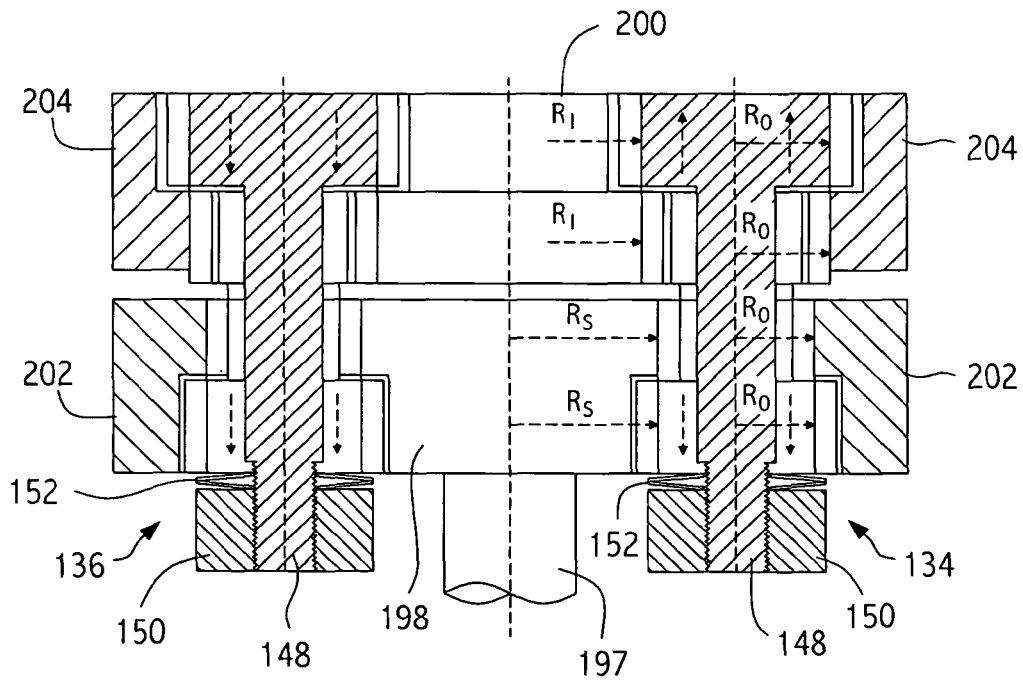
FIG. 15B is a two dimensional view of the partial tooth anti-backlash planetary transmission of FIG. 13A taken along the line A-A.

FIGS. 15A and 15B show a partial tooth anti-backlash planetary transmission 196 for herringbone planets of the type shown in FIGS. 5A and 5B. The planetary transmission 196 comprises a sun gear 198 and corresponding idler arm 200 built about a central shaft 201, a plurality of planets 134 and 136 interacting with the sun gear 198, a ground ring 202 and an output ring 204. This anti-backlash planetary transmission 196 is a full mesh system and therefore requires an even number of planets (4, 6, 8 etc.) in which planets 134 preloaded to be anti-backlash for clockwise motions are alternated with planets 136 preloaded to be anti-backlash for counterclockwise motions.

Figure 16:
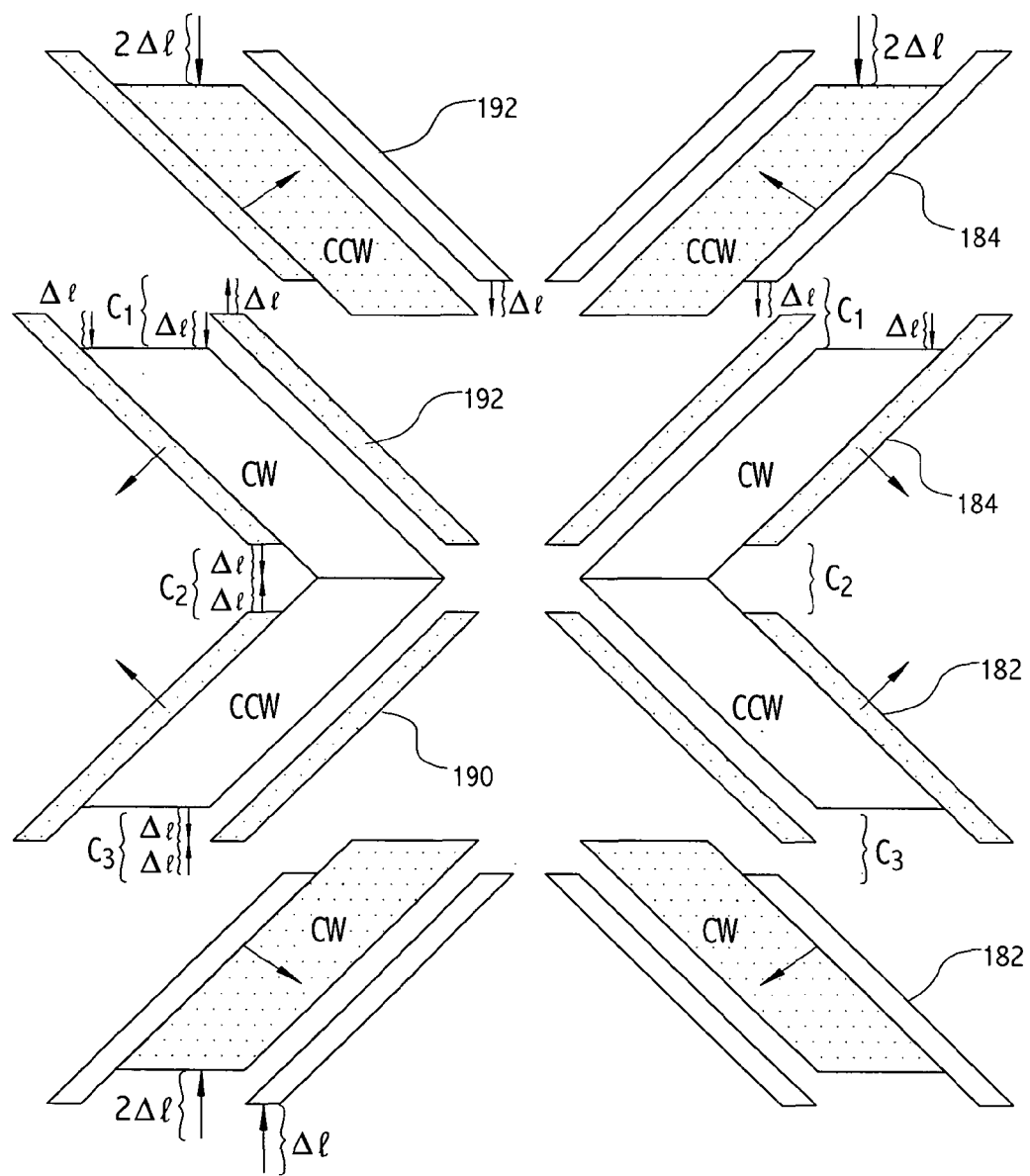
FIG. 16 is a schematic representation that illustrates an anti-backlash preload scheme for a full mesh partial tooth planetary transmission for herringbone planets of the type shown in FIG. 4B.
Figure 17A:
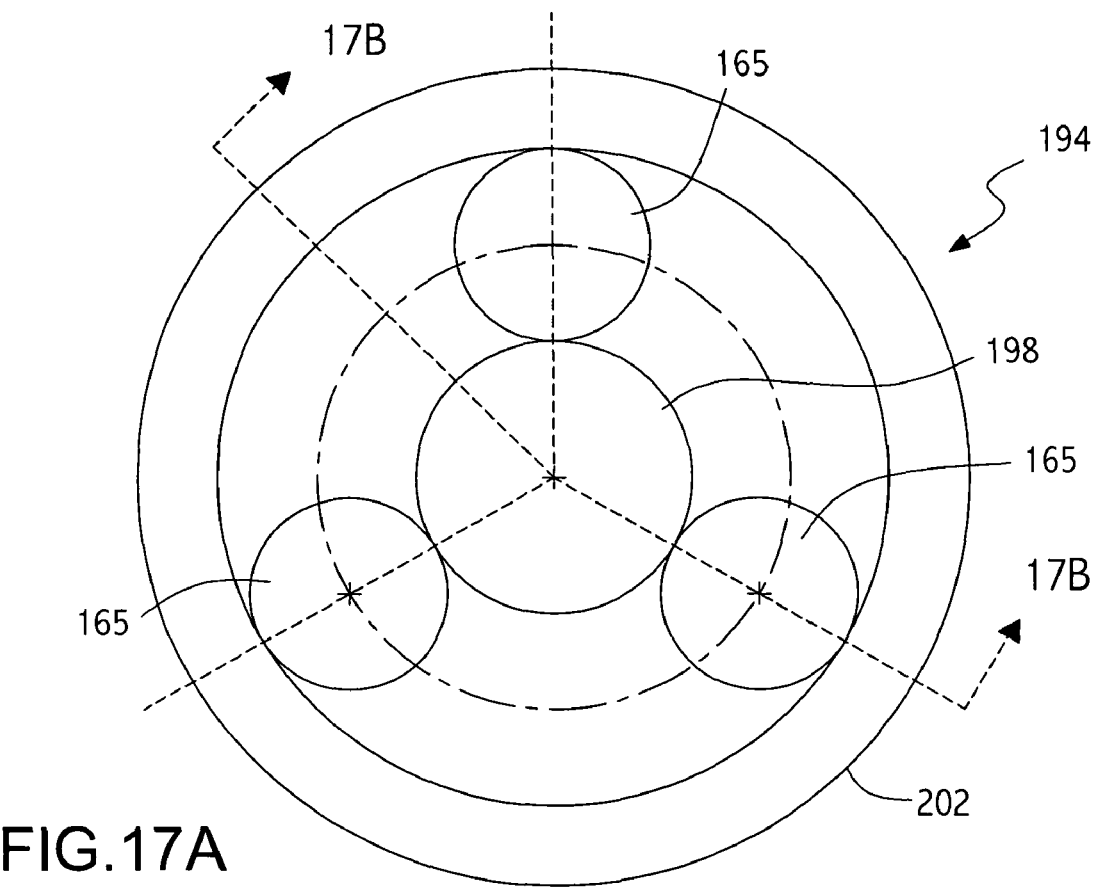
FIG. 17A is a schematic representation of yet another partial tooth partial mesh planetary transmission for herringbone or helical planets.
Figure 17B:
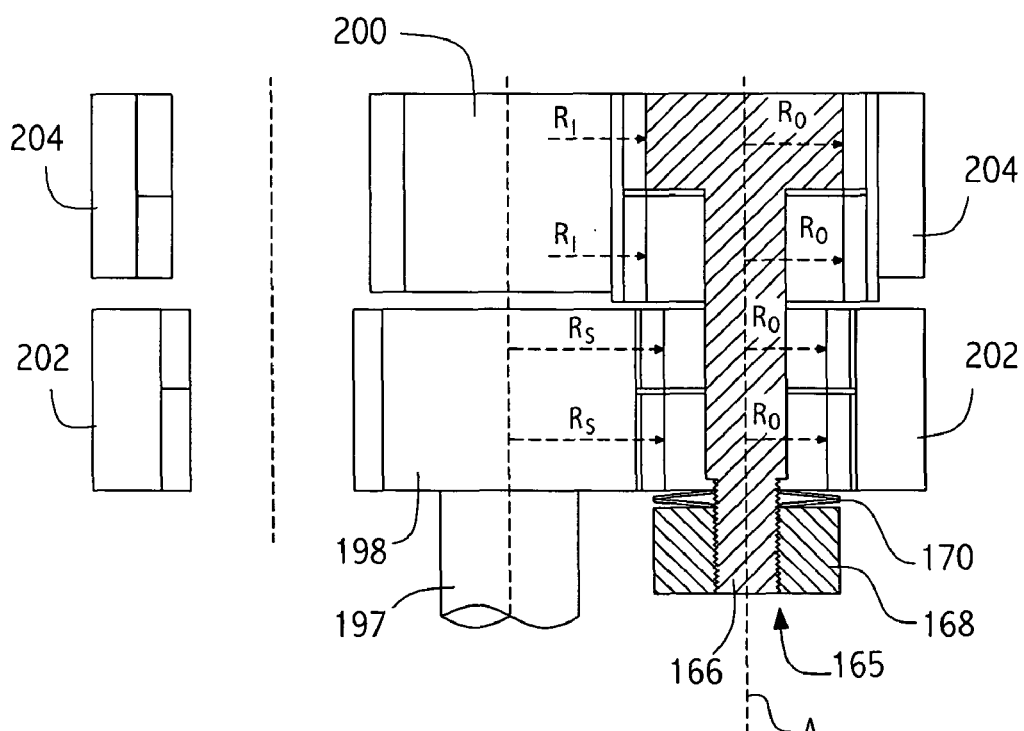
FIG. 17B is two dimensional view of the partial tooth partial mesh planetary transmission of FIG. 17A taken along the line A-A.
Figure 18:
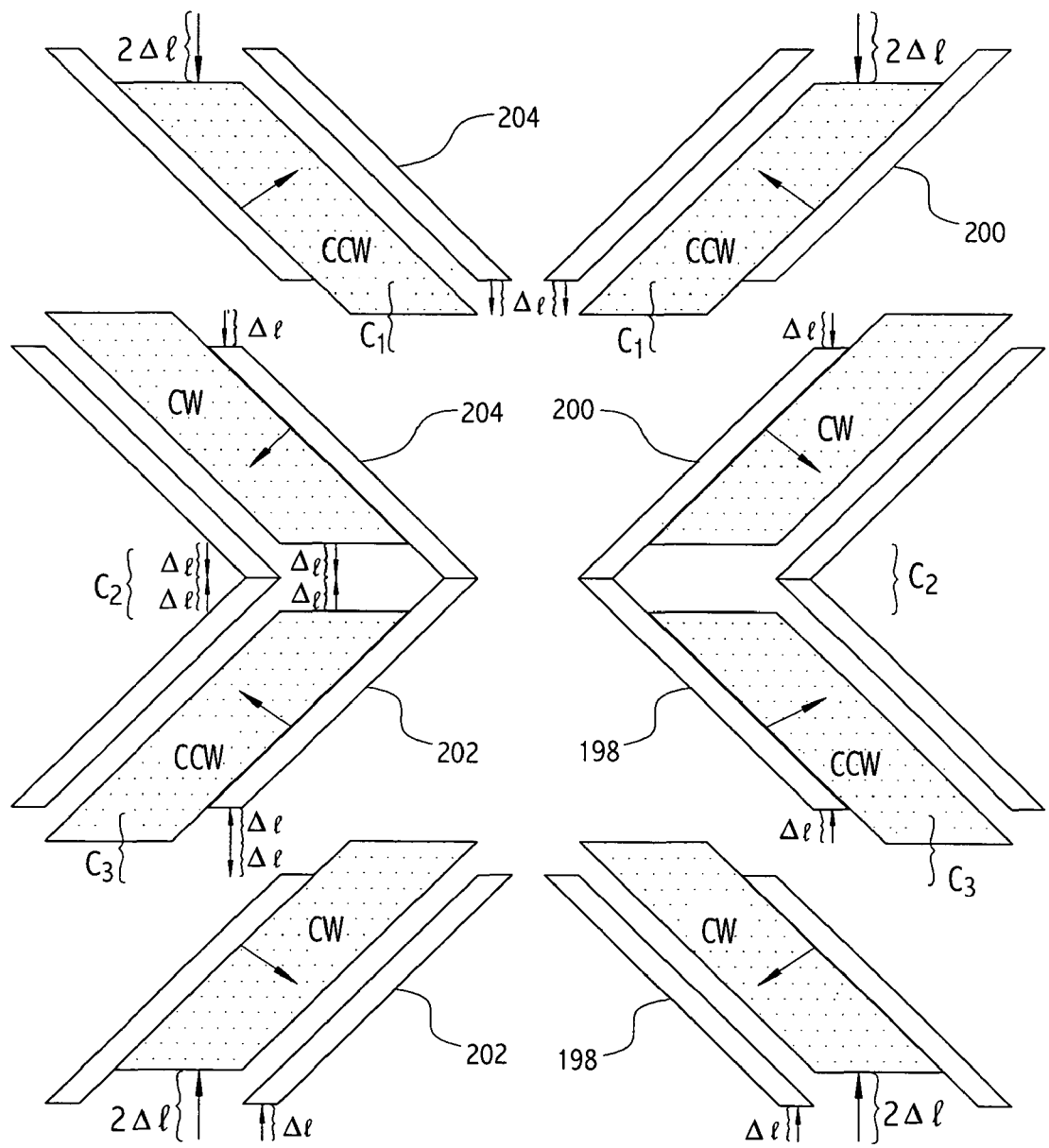
FIG. 18 is a schematic representation that illustrates an anti-backlash preload scheme for a partial mesh partial tooth planetary transmission for herringbone planets of the type shown in FIG. 9.

FIG. 16 shows an anti-backlash preload scheme for a full mesh planetary transmission using a version of the planet shown in FIG. 4B in which the stops are removed and all axial preload contacts are made as line contacts as shown in FIGS. 4B and 16. FIGS. 17A and 17B show a partial tooth, partial mesh planetary transmission with either helical or herringbone teeth. FIG. 6 shows what is meant by partial tooth, partial mesh. FIG. 9 shows a planet using a partial tooth, partial mesh configuration. And FIG. 18 shows the preload scheme for each of the partial tooth, partial mesh planets shown in FIG. 9.

Advantages Over Prior Art

Integrating roller sections into the gear bearing structure makes the roller bearing action stronger and more effective because the combined effects of the roller segments are axially long. This integration results in a more compact gear bearing by eliminating the need for a separate roller. Further, this integration and the resulting elimination of separate rollers eliminate over-constraint problems between bearing and gear action.

The integration and elimination of separate rollers is particularly useful in herringbone and helical gear configurations. (Herringbone and helical gear configurations are particularly important in making planetary transmissions stronger in handling axial loads and in anti-backlash planetary transmissions.)

The simplified construction of planets utilizing an upper planet section (preferably with threaded hex stem), a middle planet section and a lower planet section (all assembled using a simple lock washer and nut or screw), as in FIG. 4B, is advantageous in terms of simplicity, cost, reliability and compactness. The torque-locking hex shaft of FIG. 10 is particularly useful in anti-backlash transmission configurations. It permits a light spring preload to perform with great axial stiffness under load.

The anti-backlash planetary transmission using helical/herringbone gears and two (2) preload spring configurations in the planets (one pushing the upper and lower planet sections apart and one pulling them together), as in FIG. 15, has the advantage of providing a full mesh gear bearing action in both directions. The anti-backlash planetary transmission using a single (1) preload spring configuration in the Planets (pulling the upper and lower planet sections together) has the advantage of simplicity and lower costs. It is marginally less efficient than the anti-backlash planetary transmission described immediately above. This approach is used in partial tooth, full mesh and in partial tooth, partial mesh configurations. In the partial tooth, full mesh version, one (1) direction operates on the planet tooth peaks and the other direction operates on the planet tooth valleys. Thus, there is a slight difference in how it performs based on its direction of rotation. In the partial tooth, partial mesh version, both directions operate on the planet tooth peaks (or, alternatively, the planet tooth valleys). This version is also slightly less efficient than the version using two (2) preloaded spring configurations, but it does have the advantage of being consistent in both directions.

Features of the Invention Believed to be New

The concept of integrating Roller Sections into the Gear Structure to produce a true Gear Bearing is new, as are the partial tooth, full mesh and the partial tooth, partial mesh configurations. The torque locking hex shaft or stem is also new. Furthermore, the simplified construction of planets using an upper planet section (with threaded hex stem), a middle planet section and a lower planet section (all assembled using a simple lock washer and nut or screw) is new.

Additional novel features include the spur gear, helical gear and herringbone (double helical) gear versions of the partial tooth, full mesh and partial tooth, half mesh gear bearings. Moreover, the several combinations of these features into planetary transmissions using partial tooth gear bearings are each original and new. (The spur gear version and the helical/herringbone gear versions.) In particular, the anti-backlash planetary transmission using helical/herringbone gears and two (2) preloaded spring configurations in the planets (one pushing the upper and lower planet sections apart and one pulling them together) is new. The anti-backlash planetary transmission using a single (1) preload spring configuration in the planets (pulling the upper and lower planet sections together) is new as well. This approach is used in both the partial tooth, full mesh and in partial tooth, partial mesh configurations, all of which are new.

Although this invention has been illustrated and described in a few preferred embodiments, it will be appreciated by those skilled in the art that changes may be made in these embodiments without departing from the scope and spirit of the invention. Only the appended claims are to be used in defining the scope of the invention.

What is claimed is:

1. A partial gear bearing comprising:

a first portion including a plurality of first gear teeth and a first integrated roller bearing surface, and a second portion including a second plurality of gear teeth and a second integrated roller bearing surface, wherein said first and second integrated roller surfaces being substantially out of phase to thereby provide a substantially continuous roller surface about a circumference of said gear bearing and said first and second plurality of gear teeth have a gear profile such that said first and second roller bearing surfaces have a radius substantially coincident with a gear pitch radius of each of said first and second plurality of gear teeth.

2. The Partial gear bearing according to claim 1, wherein said first portion aligns with and engages a third portion of a corresponding second partial gear bearing and said second portion aligns with and engages a forth portion of said corresponding second partial gear bearing.

3. The partial gear bearing according to claim 1, wherein said gear teeth being one of a spur and herringbone teeth.

4. The partial gear bearing according to claim 1, wherein said gear teeth are spur teeth.

5. The partial gear bearing according to claim 1, wherein said gear teeth are herringbone teeth.

6. The partial gear bearing according to claim 1, further comprising;

a longitudinal gap between said first and second portions.

7. The partial gear bearing according to claim 1, wherein said first plurality of gear teeth and said second plurality of gear teeth have substantially identical profiles and said first plurality of gear teeth being out of phase relative to said second plurality of gear teeth.

8. The partial gear bearing according to claim 1, wherein corresponding peeks and valleys of said first and second plurality of gear teeth are out of phase and said first and second integrated roller surfaces being located at said valleys of said gear teeth.

9. The partial gear bearing according to claim 8, wherein said peeks and valleys of said first and second plurality of gear teeth are in phase and said first integrated roller surface being located at said peak of said first gear teeth and said second integrated roller surfaces being located at said valleys of said second gear teeth.

10. The partial gear bearing according to claim 9, further comprising;
a longitudinal gap between said first and second portions.

11. The partial gear bearing according to claim 8, further comprising;
a longitudinal gap between said first and second portions.

* * * * *